(12) United States Patent
Lázaro Blasco

(10) Patent No.: US 10,225,805 B2
(45) Date of Patent: Mar. 5, 2019

(54) METHOD FOR CONTROLLING THE TRANSMISSION POWER

(71) Applicant: DEUTSCHES ZENTRUM FÜR LUFT—UND RAUMFAHRT E.V., Köln (DE)

(72) Inventor: Francisco Lázaro Blasco, München (DE)

(73) Assignee: DEUTSCHES ZENTRUM FÜR LUFT—UND RAUMFAHRT E.V., Köln (DE)

( * ) Notice: Subject to any disclaimer, the term of this patent is extended or adjusted under 35 U.S.C. 154(b) by 0 days.

(21) Appl. No.: 15/750,397

(22) PCT Filed: Aug. 3, 2016

(86) PCT No.: PCT/EP2016/068563
§ 371 (c)(1),
(2) Date: Mar. 19, 2018

(87) PCT Pub. No.: WO2017/025413
PCT Pub. Date: Feb. 16, 2017

(65) Prior Publication Data
US 2018/0234926 A1  Aug. 16, 2018

(30) Foreign Application Priority Data

Aug. 7, 2015 (DE) .................. 10 2015 215 177

(51) Int. Cl.
*H04W 52/24* (2009.01)
*H04W 52/36* (2009.01)
(Continued)

(52) U.S. Cl.
CPC ......... *H04W 52/243* (2013.01); *H04W 52/20* (2013.01); *H04W 52/343* (2013.01); *H04W 52/367* (2013.01)

(58) Field of Classification Search
CPC . H04W 52/20; H04W 52/243; H04W 52/343; H04W 52/367
(Continued)

(56) References Cited

U.S. PATENT DOCUMENTS 6,421,327 B1 * 7/2002 Lundby ................. H04W 52/24
370/310
6,549,755 B2 * 4/2003 Chu ...................... H04B 7/1851
375/345

(Continued)

*Primary Examiner* — Tan H Trinh
(74) *Attorney, Agent, or Firm* — Morgan, Lewis & Bockius LLP

(57) ABSTRACT

The invention relates to a method for determining the power control parameters in order to control the power, in particular the energy per symbol, with which signals are transmitted from transmitters of a group of multiple transmitters to a receiver assigned to said group in packets according to a multiplex specification in a communication system. Each transmitter of a group determines the transmitter transmission power randomly such that the signal-to-noise ratio of the receiver lies between a minimum and a maximum value. The minimum and maximum signal-to-noise ratio values that determine to which group a transmitter belongs are defined in a first table, and the probability value used for the transmitter is defined in a second table in order to determine the transmission power of the transmitter such that the transmitter signal-to-noise ratio lies within the total range of permissible signal-to-noise ratios or within the signal-to-noise ratio that is permissible for the group to which the transmitter belongs. New values for the first and second tables are defined such that the maximum load in packets per seconds which can be accepted by the communication channel while maintaining a desired threshold packet error rate is maximized and/or the distance from the histogram of received signal-to-noise ratios in dB to a uniform histogram of signal-to-noise ratios in dB is minimized.

16 Claims, 10 Drawing Sheets

Figure 1:
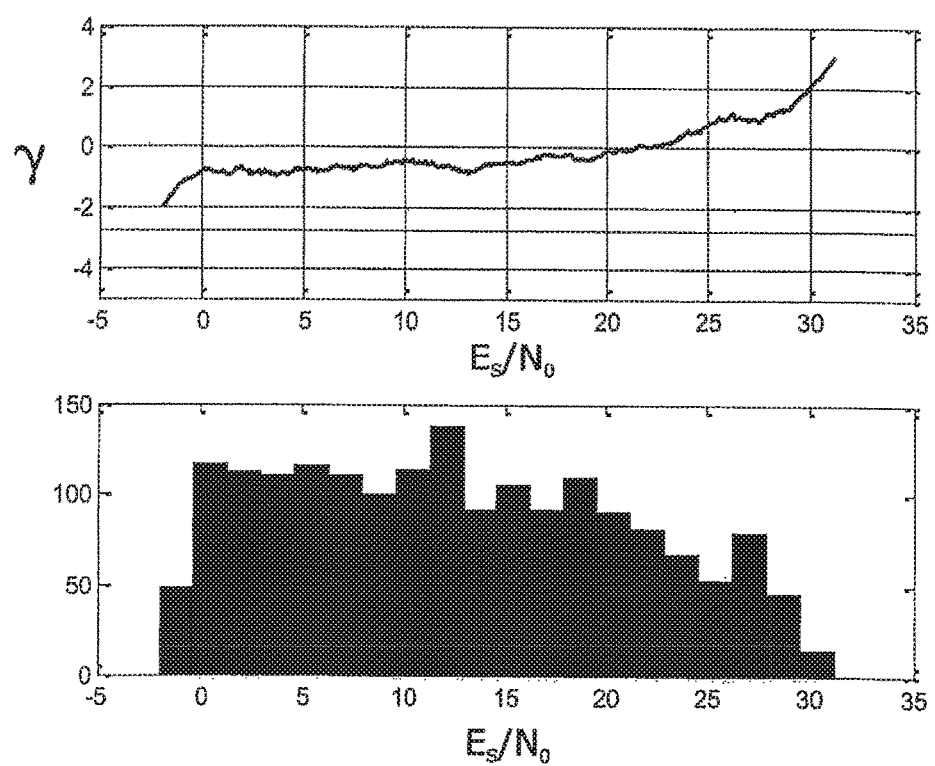

(51) Int. Cl.
*H04W 52/20* (2009.01)
*H04W 52/34* (2009.01)

(58) Field of Classification Search
USPC ............... 455/69, 522, 13.4, 430, 442, 574;
370/252, 278, 328, 329, 310, 413, 416;
375/222, 285, 345
See application file for complete search history.

(56) References Cited

U.S. PATENT DOCUMENTS

| | | | | |
|---|---|---|---|---|
| 7,009,944 B1* | 3/2006 | Hulbert | ............... | H04W 52/223 370/252 |
| 2002/0181484 A1* | 12/2002 | Aimoto | ................... | H04L 47/10 370/413 |
| 2004/0058700 A1* | 3/2004 | Nilsson | ................ | H04W 52/40 455/522 |
| 2004/0166884 A1* | 8/2004 | Oh | ........................ | H04W 52/40 455/522 |
| 2007/0281757 A1* | 12/2007 | Iguchi | ................... | H04L 1/0045 455/574 |
| 2009/0036155 A1* | 2/2009 | Wu | ..................... | H04W 52/286 455/522 |
| 2010/0177838 A1* | 7/2010 | Schenk | ..................... | H04B 3/32 375/285 |
| 2011/0085503 A1* | 4/2011 | Nam | ..................... | H04B 7/0452 370/329 |
| 2011/0164514 A1* | 7/2011 | Afkhamie | ............. | H04W 52/42 370/252 |
| 2011/0319119 A1* | 12/2011 | Ishii | ....................... | H04L 5/0007 455/522 |
| 2016/0050127 A1* | 2/2016 | Prodan | ..................... | H04B 3/46 375/222 |
| 2017/0141833 A1* | 5/2017 | Kim | ........................ | H04L 5/00 |
| 2017/0212210 A1* | 7/2017 | Chen | ........................ | G01S 5/06 |

* cited by examiner

METHOD FOR CONTROLLING THE TRANSMISSION POWER

RELATED APPLICATIONS

This application is the U.S. National Phase under 35 U.S.C. § 371 of International Application No. PCT/EP2016/068563, filed on Aug. 3, 2016, which in turn claims the benefit of German Application No. 10 2015 215 177.8, filed on Aug. 7, 2015, the disclosures of which are incorporated in their entirety by reference herein.

The invention relates to a method for controlling the transmission power (energy per symbol) by which, in a communication system, signals can be transmitted from transmitters of a group of a plurality of transmitters to a receiver assigned to this group, the transmission being performed in a packet-wise manner according to a multiplex specification, particularly a random access specification.

This invention proposes a new technique to perform power control when a random access technique is used to access a common transmission medium.

Random Access is a technique for the transmission of information over a transmission medium where a plurality of terminals are sharing the transmission medium. In random access techniques, there is no central control unit which controls access to the transmission medium.

An example of a random access technique is the Aloha protocol, where each participant sends its data packets at any time and asynchronously. If more than one participant transmits simultaneously, the data packets collide and might become lost.

Other random access techniques exist, which provide a higher throughput. A technique which has drawn much attention is Spread Spectrum Aloha (SSA) with Successive Interference Cancellation (SIC) at the receiver. When this technique is used similarly to Aloha, terminals transmit their packets at any time and in an asynchronous manner using spread spectrum techniques. At the receiver, packets generally collide. However, due to the spreading technique used, packets can be decoded even when they suffer collisions. A standard SSA receiver tries to decode one packet at a time while treating the rest of the packets as interference. A more advanced receiver employs the SIC at the receiver. In other words, the receiver stores the received waveform for a temporal window of a length T. Inside this window, the receiver starts decoding the packet with the highest $E_s/(N_0+I)$. If the packet is successfully decoded, the receiver reconstructs the waveform from this packet and cancels it in its window. Hence the Interference created to all other packets is cancelled. The receiver searches for the packet with the highest power among those packets still present in its window, decodes it, cancels the interference. and the process is repeated again until no further packets are present.

When SSA with SIC is used, the power with which the different packets are received plays a key role in the decoding process. In fact, if all packets are received with the same power, the SIC cannot increase the load with respect to standard decoding. However if the power with which the packets are received follows the right distribution, the SIC at the receiver can increase the throughput of the SSA greatly.

The role of the power distribution of the packets will be illustrated hereunder by way of a simple example. There shall be considered a slotted SSA scheme where a fixed number of users M transmit one packet in each time slot. All packets will use the same transmission mode (physical and link layer transmission parameters: modulation, coding scheme etc.). γreq shall be defined as the minimum required $E_s/(N_0+I)$ that a burst must have so that it can be correctly decoded (Es=P/fs, where fs is the symbol rate used). P(i) will denote the power with which the i-th packet was received. For the sake of simplicity, the users will be arranged in descending order according to their power P, so that P(1)>P(2)> . . . P(M−1)>P(M). The effective $E_s/(N_0+I)$ for packet "i" at decoding is defined as:

$$\gamma(i) = \frac{E_s}{N_0 + I(i)} \text{ where } I_{\mathit{eff}}(k) = \sum_{i=1}^{k-1} P(i)$$

is the interference from all the users which have not been yet decoded.

Let it be assumed that packet "i" gets decoded with probability 1 whenever γ(i)>γreq. If γ(i)<γreq, the packet "i" and all the subsequent packets, i.e. the packets i,i+1 . . . M, will be lost.

Figure 2:
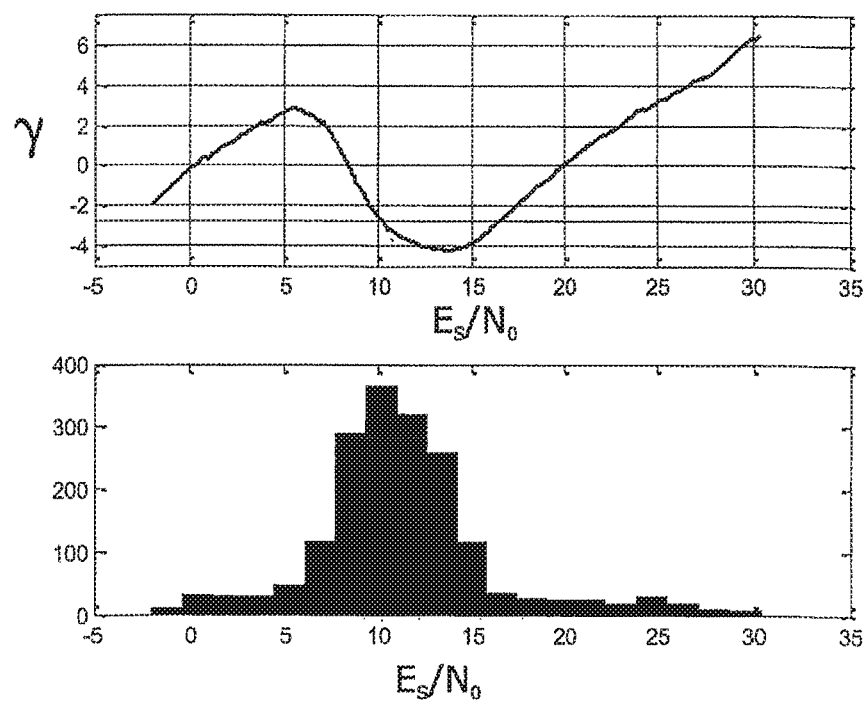

In order to illustrate the effect of the power distribution in the performance of the system, two examples will be provided. In FIG. 1, in the upper part, there is shown a plot of γ vs $E_s/N_C$ for the different users. The black horizontal boundary line shows γreq=−2.7 dB, wherein the graph represents γ vs $E_s/N_C$. In this case, since γ(i)>γreq ∀i, all the packets can be decoded. The lower part of FIG. 1 shows the histogram of $E_s/N_C$. FIG. 2 shows the same plot for an overloaded system in which some packets are lost. Concretely, all users with $E_s/N_C$ below 17 dB cannot be decoded. The number of users is the same in both examples of FIGS. 1 and 2, the only difference residing in the power distribution of the packets.

A good power distribution will induce a γ vs $E_s/N_C$ curve in which $\gamma(i) > \gamma_{req}$ ∀i. In the ideal case, there will apply γ(i)=γreq ∀i, which is obtained using a uniform distribution for $E_s/N_C$ in dB.

Hereunder, a power control mechanism as disclosed in [3] will be described which allows to optimize the power distribution of the received packets in a great variety of situations.

The state-of-the-art is aware that the power distribution of the packets at the receiver is of key importance for SSA under SIC. In [1], the authors show that, if the power of the packets follows a lognormal distribution, the throughput can be increased in case that the standard deviation of the lognormal deviation increases. S-MIM [2], an ETSI standard, uses SSA with SIC at the receiver for mobile satellite communications. In order to optimize the power distribution of the incoming packets, terminals can apply a uniformly distributed power backoff in dB. A terminal sets its transmission power to:

$$P = L + N_{SAT} + K + R_{rand} \text{ dBm},$$

where:

L is the estimated attenuation that the terminal suffers in the return link, $N_{SAT}$ is the noise and interference power level at the receiver. These parameters are computed by the receiver and are broadcasted to all terminals over the forward link, K is defined as C/(N0+I0)|T−GS, where C/(N0+I0)|T is the target value for which the desired relationship of C/(N0+I0) at the satellite transponder input and GS is the satellite antenna amplification in the edge region of the radiation coverage of the antenna on the ground, and $R_{rand}$ is a random value uniformly distributed between 0 and $R_{max}$. The parameter $R_{max}$ is also computed by the receiver and is broadcasted to all terminals over the forward link.

In case the required power P needed exceeds the terminal capabilities, the terminal does not transmit. S-MIM is a mobile satellite communications system, hence, after some time the terminal moves and the path attenuation decreases and the terminal can transmit.

In the following, several examples will be given in which SSA with SIC at the receiver is used in satellite communications in which the technique used in [2] can be improved.

Figure 3:
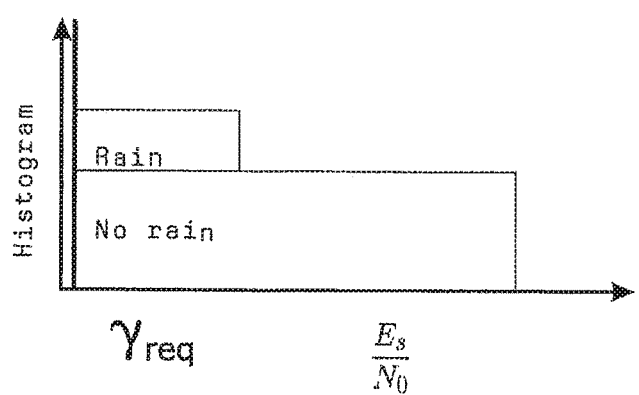

In the first example, there shall be considered one satellite beam in the return link in which a fraction q of the users suffers rain attenuation. FIG. 3 shows the histogram of $E_s/N_C$ (in dB) for all packets when the technique in [2] is used for power control. Looking at FIG. 3, it is obvious that the distribution of $E_s/N_C$ with which the packets are received is far from being a uniform distribution. There is a higher concentration of packets with low values of $E_s/N_C$. The reason behind is that, for the fraction q of users which suffer rain attenuation, it is impossible to reach high values (in dB) of $E_s/N_C$.

Figure 4:
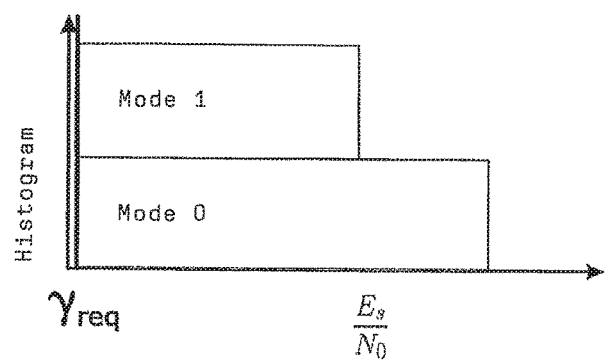

In the second example, there shall be considered a satellite beam in the return link in which not all users use the same transmission mode (physical and link layer configuration). Let it be assumed that two transmission modes are used which employ the same modulation and coding scheme and occupy the same transmission bandwidth. However, the spreading factor used will be different in the two modes. Mode 0 will use a spreading factor of 256 whereas mode 1 will use a spreading factor of 64. It shall further be assumed that all terminals have the same maximum transmission power. Using the power control in [2], the $E_s/N_C$ histogram in FIG. 4 is obtained. Also here, the distribution of $E_s/N_C$ is not uniform (in dB). Again there is higher concentration of packets with low values of $E_s/N_C$. The reason now is that only users from mode 0 can achieve the higher range of $E_s/N_C$.

The technique described in [2] is appropriate for mobile satellite communications where fade events are caused by blockage of the path to the satellite by a building, for example. Since users are moving, fade events tend to be short. In other words, after a short time, the terminal is likely to be again in an area with good propagation conditions. However, the technique described in [2] is not appropriate for fixed satellite communications because the fade event can be long. Fade events are normally caused by rain, which can last minutes or even hours. If the technique described in [2] is used, users having "bad" propagation conditions may have to wait for a long time until they are able to transmit. However, their propagation conditions would (still) be good enough to achieve error free transmission.

Hereunder, there will be described a method for controlling the transmission power (energy per symbol) according to [3] by which, in a communication system, signals can be transmitted from transmitters of a group of a plurality of transmitters to a receiver assigned to this group, the transmission being performed in a packet-wise manner according to a multiplex specification, particularly a random access specification, where, in the known method, the transmission powers by which the transmitters of a group transmit are within a total power range, and to each transmitter, a parameter is assigned which indicates how high the transmission power is by which the respective transmitter transmits, wherein the parameter is computed on the basis of a random number and on the basis of probability values for the probability that the transmitters of the group transmit within different presettable power segments within the total power range.

In this known method, a first table is provided which indicates different transmission power segments of the total transmission power range that are respectively defined by a lower limiting value and an upper limiting value, a second table is provided in which, for each transmission power segment, a statistical probability value is included which indicates how many transmitters transmit with a transmission power within the respective transmission power segment, wherein each probability value of the second table is assigned to a different transmission power segment, whereby, by said two tables, the expectation is defined as to how many transmitters of the group transmit signals with a transmission power within the respective transmission power segment, for each transmitter, a random number is provided (either by the transmitter itself or from outside) on whose basis probability values to be assigned to the respective transmitters are computed as the assigned parameters of the transmitters and, thereby, to each transmitter, there is assigned that transmission power segment which includes the transmission power by which the respective transmitter transmits, and the amount of the transmission power by which the respective transmitter transmits is selected within the transmission power segment assigned to this transmitter, by performing a further computation performed on the basis of a random number.

According to an advantageous embodiment of the known method, it is provided that each transmitter has a maximum transmission power, wherein each transmitter is assigned to that transmission power segment which includes its maximum transmission power, wherein, for each transmitter, a random number, computed under consideration of a uniform distribution over a presettable range of numbers, is provided (either by the transmitter itself or from outside) on whose basis, with the aid of the probability value for the transmission power segment assigned to the respective transmitter, it is detected whether the transmission power of the transmitter lies between the lower limit of the respective transmission power segment and a maximum transmission power, or between the lower limit of the total transmission power and its maximum transmission power.

Further, in the known method, it can be suitable that each transmitter has a maximum transmission power, wherein each transmitter is assigned to that transmission power segment which includes its maximum transmission power, wherein, for each transmitter, a random number, computed under consideration of a uniform distribution over a presettable numerical range, is provided which, with uniform statistical distribution, can lie within the numerical range and particularly between zero and one, and wherein the respective transmitter if its random number is smaller than the probability value for the transmission power segment to which the transmitter is assigned, transmits with a transmission power between the lower limit of the transmission power segment and the maximum transmission power of the transmitter, and if its random number is larger than or equal to the probability value for the transmission power segment to which the transmitter is assigned, transmits with a transmission power between the lower limit of the total transmission power range and the maximum transmission power of the transmitter.

Advantageously, in the known method, the transmitters can transmit in different modes, particularly with different transmission rates (bit rates), wherein, for each mode, control of the transmission powers of all transmitters is performed as described above.

According to an advantageous embodiment of the known method, it is provided that, prior to transmission of a signal from the transmitter to the receiver and/or in regular or irregular intervals, control of the transmission powers of the transmitters is performed as described above.

According to an advantageous embodiment of the known method, it is provided that a transmitter of the group, in case that there is assigned to it a transmission power—within a transmission power segment—that exceeds its maximum transmission power, will transmit with a transmission power between a presettable minimum value and it maximum transmission power, namely, when seen in a logarithmic scale, with uniform distribution if the maximum transmission power is smaller than the lower limiting value of the respective transmission power segment.

This known power controlling scheme is provided for the return link of a communication system, wherein a plurality of terminals communicate with a communication node by means of a random access scheme. No specifications are made for the random access scheme; the latter could or could not be provided with time slots, could or could not use a spreading and could or could not use replicas. The communication node could or could not use a use interference cancellation or some other kind of multi-participant detection.

Terminals may use different physical and link layer configurations (communications modes) to transmit their data.

Let it be assumed that a forward link exists over which the hub can send broadcast signaling to the terminals.

The hub will send two signaling tables to the terminals, namely table 1 and table 2, to the terminals. In Table 1, upper and lower $E_s/N_C$ values are given in dB for the respective transmission power segments. The probability values in Table 2 take values between 0 and 1 and define the probabilities as to how many transmitters are transmitting with transmission powers within the respective segments.

TABLE 1

| Signaling table 1. Signal generation table 1 | | | | |
|---|---|---|---|---|
| Mode | $E_s/N_{C1}$ | $E_s/N_{C2}$ | $E_s/N_{C3}$ | ... | $E_s/N_{Cu}$ |
| 0 | $E_s/N_{C0,1}$ | $E_s/N_{C0,2}$ | $E_s/N_{C0,3}$ | ... | $E_s/N_{C0,u}$ |
| 1 | $E_s/N_{C1,1}$ | $E_s/N_{C1,2}$ | $E_s/N_{C1,3}$ | ... | $E_s/N_{C1,u}$ |
| ... | ... | ... | ... | ... |
| m | $E_s/N_{Cm,1}$ | $E_s/N_{Cm,2}$ | $E_s/N_{Cm,3}$ | ... | $E_s/N_{Cm,u}$ |

TABLE 2

| Signaling table 2. Signal generation table 2 | | | |
|---|---|---|---|
| Mode | $\text{Prob}_1$ | $\text{Prob}_2$ | ... | $\text{Prob}_{u-1}$ |
| 0 | $p_{0,1}$ | $p_{0,2}$ | | $p_{0,u}$ |
| 1 | $p_{1,1}$ | $p_{1,2}$ | | $p_{1,u}$ |
| ... | ... | ... | |
| m | $p_{m,1}$ | $p_{m,2}$ | | $p_{m,u}$ |

The terminals can estimate the $E_s/N_C$ at the receiver side as a function of their transmission power. Terminals may compute this estimate using an open or closed loop mechanism.

Terminals use then these tables to compute their transmission power in the following way.

If a terminal wants to transmit with a transmission mode "i" it will use the i-th row of Table 1 and Table 2.

The terminal estimates the maximum $E_s/N_C$ it can achieve at the hub by using its maximum transmission power. Denoted as B is the maximum $E_s/N_C$ that the terminal can achieve in dB.

The terminal generates a pseudo random number t uniformly distributed between 0 and 1.

The terminal determines which is the largest n, n_max, for which $B > E_s/N_C$ i,n. If n_max is equal to u the terminal sets n_max to u−1.

If $t < p_{i,n\_max}$, the terminal sets $A_{min} = E_s/N_C$ i,n_max and $A_{max} = E_s/N_C$ i,n_max+1. Otherwise, the terminal sets $A_{min} = E_s/N_C$ i,1 and $A_{max} = E_s/N_C$ i,u.

The terminal then computes "its" $E_s/N_C$ at the receiver as follows:

---
```
If B < Es/N_{Ci,1}
    E_s/N_C = −infinity (The terminal does not transmit),
Else
    If B < A_min
        E_s/N_C uniformly distributed between E_s/N_{C i1} and B
    Else
        If B < A_max
            E_s/N_C uniformly distributed between A_min and B
        Else
            E_s/N_C uniformly distributed between A_min and A_max
        End
    end
end
```
---

As already mentioned above, all the $E_s/N_C$ values are in dB.

Note that the number of modes m can be arbitrary (there may be one or more). The number of columns in the table u can be fixed or variable. The hub may decide to increase or decrease the number of columns u dynamically.

It should be remarked also that, even when u=2 and m=1, the proposed scheme is not identical to [2]. In the proposed technique terminals always transmit whenever they estimate that they can achieve $E_s/N_C > E_s/N_C$ i1.

This known method is characterized by the following features:

The hub broadcasts a table with u $E_s/N_C$ values which defines (u−1) $E_s/N_C$ segments for each transmission mode.

The hub broadcasts a table with (u−1) probability values of using each of the $E_s/N_C$ segments.

According to the table with probability values, the terminals choose a $E_s/N_C$ at random in which they will randomize its $E_s/N_C$ uniformly.

Terminals always transmit whenever they can achieve a $E_s/N_C$ which is above $E_s/N_C i1$.

EXAMPLE 1

There be considered the return link of a satellite communication system and, herein, one of the beams of the return link. Terminals transmit using SSA and the receiver uses SIC. All terminals use the same transmission mode such as, for example:
BPSK modulation
Code rate=1/3
Spreading factor 256.
2500 users The link margin for a terminal positioned in the center of the beam is 29 dB.

The link budget loss due the position of a terminal in the beam is $L_b$ and follows a uniform distribution (−6,0) dB. The terminals' estimate of $L_b$, $\hat{L}_b$, is Gaussian distributed in dB with mean $L_b$ and standard deviation 0.5 dB.

A fraction 25% of the terminals has rain attenuation. The rain attenuation $L_r$ has a Gaussian distribution in dB with mean −10 dB and standard deviation 1 dB. The terminals' estimate of the rain attenuation $\hat{L}_r$ is Gaussian distributed in dB, and has mean $L_r$ and standard deviation 1 dB.

Figure 5:
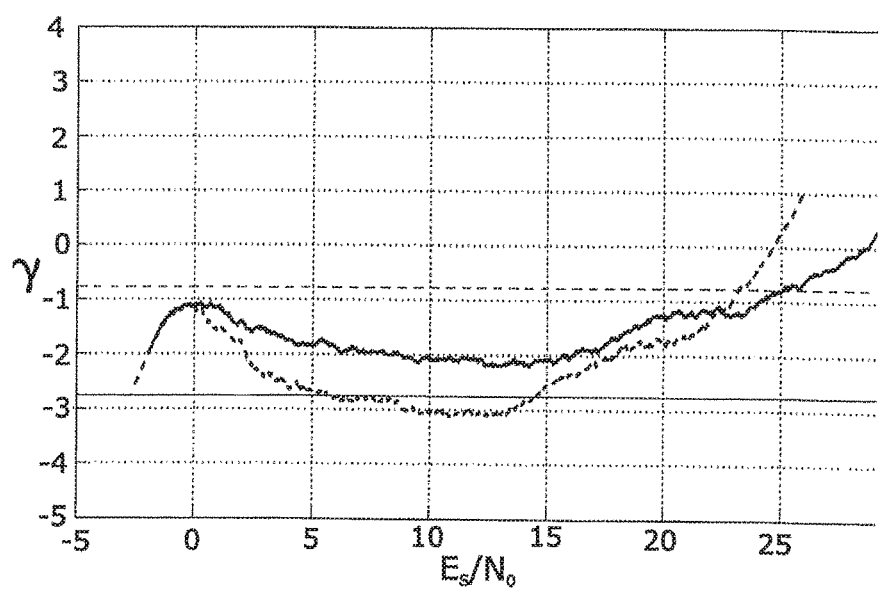

FIG. 5 shows a plot of γ vs $E_s/N_C$ for the power control described in [2](dashed line) and the power control proposed in this invention (solid line) using the following signaling tables:

| Mode | Es/No_1 | Es/No_2 | Es/No_3 | Es/No_4 |
|---|---|---|---|---|
| 1 | −0.8 | 14.2 | 22.2 | 31.2 |

| Mode | p_1 | p_2 | p_3 |
|---|---|---|---|
| 1 | 0.0 | 0.13 | 0.1 |

It can be observed how, for the power control described in [2], γ falls below γreq for a range of values of $E_s/N_C$. However, using the known method, γ>γreq in all the range of $E_s/N_C$, except for very low values of $E_s/N_C$. Under the same conditions, the known power control technique allows to increase the throughput by 10% compared to the technique in [2].

In order to explain better how the known method works, some details about the receiver processing will be given. From the 2500 terminals which are transmitting:
(1−0.0)×2500=2500 terminals in average will select the Es/No segment from −0.8 to 14.2
(1−0.13)×2500=2175 terminals in average will select the Es/No segment from 0.8 to 22.2
(1−0.10)×2500=2550 terminals in average will select the Es/No segment from 0.8 to 31.2

It be assumed that a terminal estimates its maximum Es/No, B, to be 33 dB. The terminal would generate an uniformly distributed random number between 0 and 1, t.
If t<0.1, the terminal selects its transmission power so that the Es/No at the hub is uniformly distributed between Es/No_3=22.2 dB and Es/No_3=31.2 dB.
If t>0.1, the terminal selects its transmission power so that the Es/No at the hub is uniformly distributed between Es/No_1=−0.8 dB and Es/No_3=31.2 dB.
It be assumed that a second terminal estimates its maximum Es/No, B, to be 25 dB. The terminal would generate an uniformly distributed random number between 0 and 1, t.
If t<0.1, the terminal selects its transmission power so that the Es/No at the hub is uniformly distributed between Es/No_3=22.2 dB and B=25 dB.
If t>0.1, the terminal selects its transmission power so that the Es/No at the hub is uniformly distributed between $E_s/No\_1$=−0.8 dB and B=25 dB.
It be assumed that a third terminal estimates its maximum Es/No, B, to be −3 dB. The terminal would not transmit at all because its maximum estimated Es/No is smaller than Es/No.

In order to generate a transmission power so that the Es/No at the hub is uniformly distributed between Z1 dB and Z2 dB (Z1<Z2) the terminal can, for example, generate a uniformly distributed random h number between 0 and 1. The Es/No is then computed as Es/No=Z1+(Z2−Z1)×h.

A further example should be given as to how the terminal can estimate the Es/No at the hub.

The terminal sends a message with transmission power Pa dB over the random access channel
The hub replies to this message giving the Es/No="$E_s$/No a" in dB with which the packet was received.
The terminal receives this message and "knows" that power Pa in dB generates Es/No in dB. Now the terminal can compute the Es/No generated by a transmission power. For example, using a transmission power Pa-3 in dB will generate Es/No=Es/No a−3 dB at the hub.

With this method, the terminal can also estimate B, the maximum Es/No that it can generate at the hub.

EXAMPLE 2

In this second example, there be considered a similar case to example 1 in which there are no terminals with rain attenuation and there are two transmission modes which use the same modulation and coding and occupy the same bandwidth but mode 1 has spreading factor 256 and mode 2 has spreading factor 64. There is considered a system with 1200 users from mode 1 and 300 users of mode 2.

Figure 6:
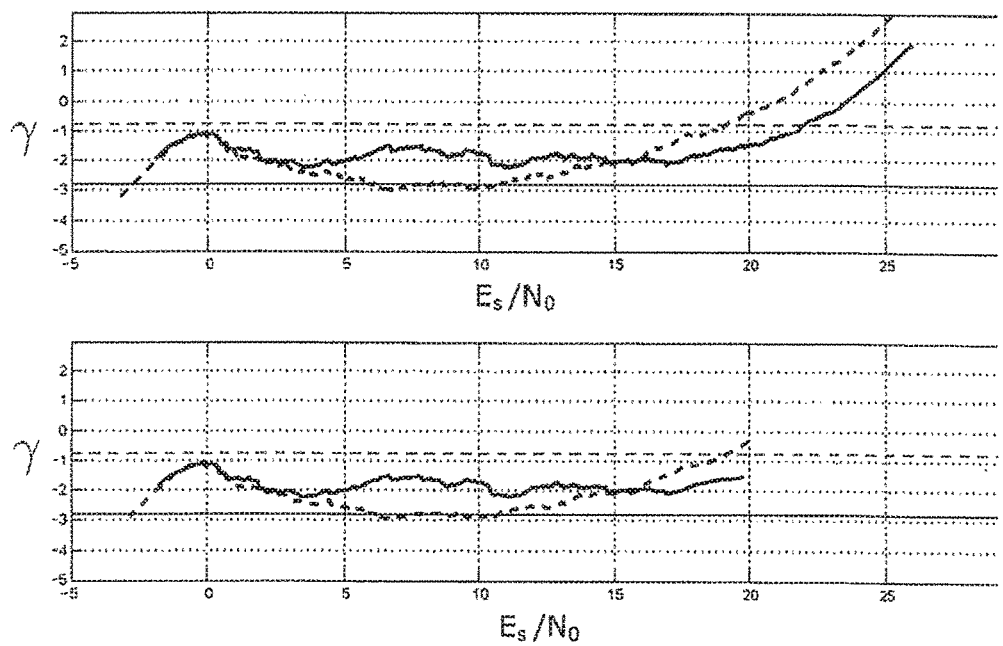

FIG. 6 shows a plot of γ vs $E_s/N_C$ for the power control in described [2](dashed line) and the power control proposed in this invention (solid line) using the following signaling tables:

| Mode | Es/No_1 | Es/No_2 | Es/No_3 | Es/No_4 |
|---|---|---|---|---|
| 1 | −0.8 | 2.2 | 17.2 | 31.2 |
| 2 | −0.8 | 2.2 | 17.2 | 31.2 |

| Mode | p_1 | p_2 | p_3 |
|---|---|---|---|
| 1 | 0.05 | 0.6 | 0.25 |
| 2 | 0 | 0 | 0 |

It can be observed how for the power control described in [2], γ falls below γreq for a range of values of $E_s/N_C$ for the two transmission modes. However, using this known method, γ>γreq in all the range of $E_s/N_C$ and for the two transmission modes. Under the same conditions, the known power control technique allows to increase the throughput by 10% compared to the technique in [2].

As evident from the above, the use of the method according to [3] makes it possible to considerably improve the transmission power control as compared to the state of the art according to [2]. For this purpose, parameters are defined in [3] that have to be communicated to the transmitters.

Hereunder, considerations according to the invention are developed as to how to compute/define particularly suited values for these parameters.

Thus, it is an object of the invention to further enhance the known method according to [3].

According to the invention, to achieve the above object, there is proposed a method according to claim 1. Advantageous embodiments of the invention are the subject matter of the respective subclaims.

In [3], a series of parameters are defined which have to be signaled to the transmitters, and the way in which the transmitters have to compute their transmission power using the parameters. If the parameters are defined "properly" the $\gamma$ vs $E_s/N_C$ curve can be controlled.

In [3] it is not explained how suitable parameters can be obtained. In a real system the receiver (satellite hub, for example) needs to compute somehow the power control parameters and signal them to the terminals.

From [3], the recognition has been derived that, for achieving a good performance in the uplink of a large number of terminals to a satellite, care should be taken that, each time, a specific number of terminals should broadcast in different power segments (e.g. 60% in the power segment A, 11% in the power segment B, etc.). By the invention, there are performed the adaptation/definition of the limits of the individual power segments by which the intended total power range in which the terminals transmit, is covered, and the definition of the respective number of terminals that shall transmit in the respective power segment. By "terminals", there are thus meant the transmitters of a group consisting of a plurality of transmitters which transmit their signals, in a packet-wise manner according to a multiplex specification, particularly a random access specification, to a receiver (e.g. satellite) assigned to one of this group of transmitters.

In this invention, a method is described which allows computing the values of the power control parameters defined in [3]. This allows optimizing the power distribution of the received packets in a great variety of situations.

The transmission/reception scenario for practicing the invention is, briefly summarized, as follows.

A satellite which is assigned as a receiver to a group of transmitters will transmit one and the same signal to the transmitters of "its" group. Thereupon, the transmitters will transmit information back to the satellite, notably in a packet-wise manner according to a multiplex method. To make it possible that all transmitters will successfully transmit their information packets to the satellite, a best uniform distribution of the transmitters over the entire Es/No is required.

Figure 7:
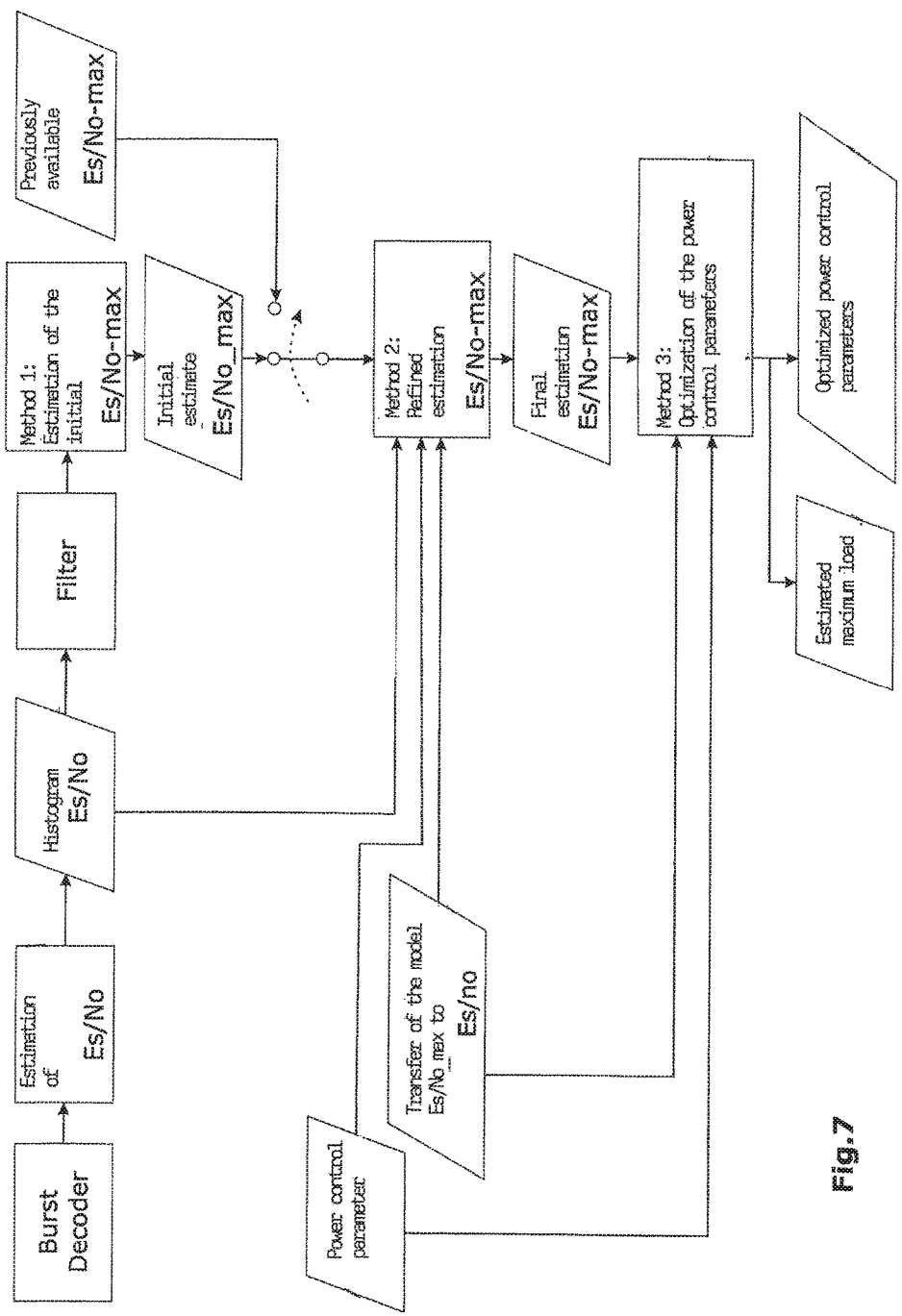
Figure 8:
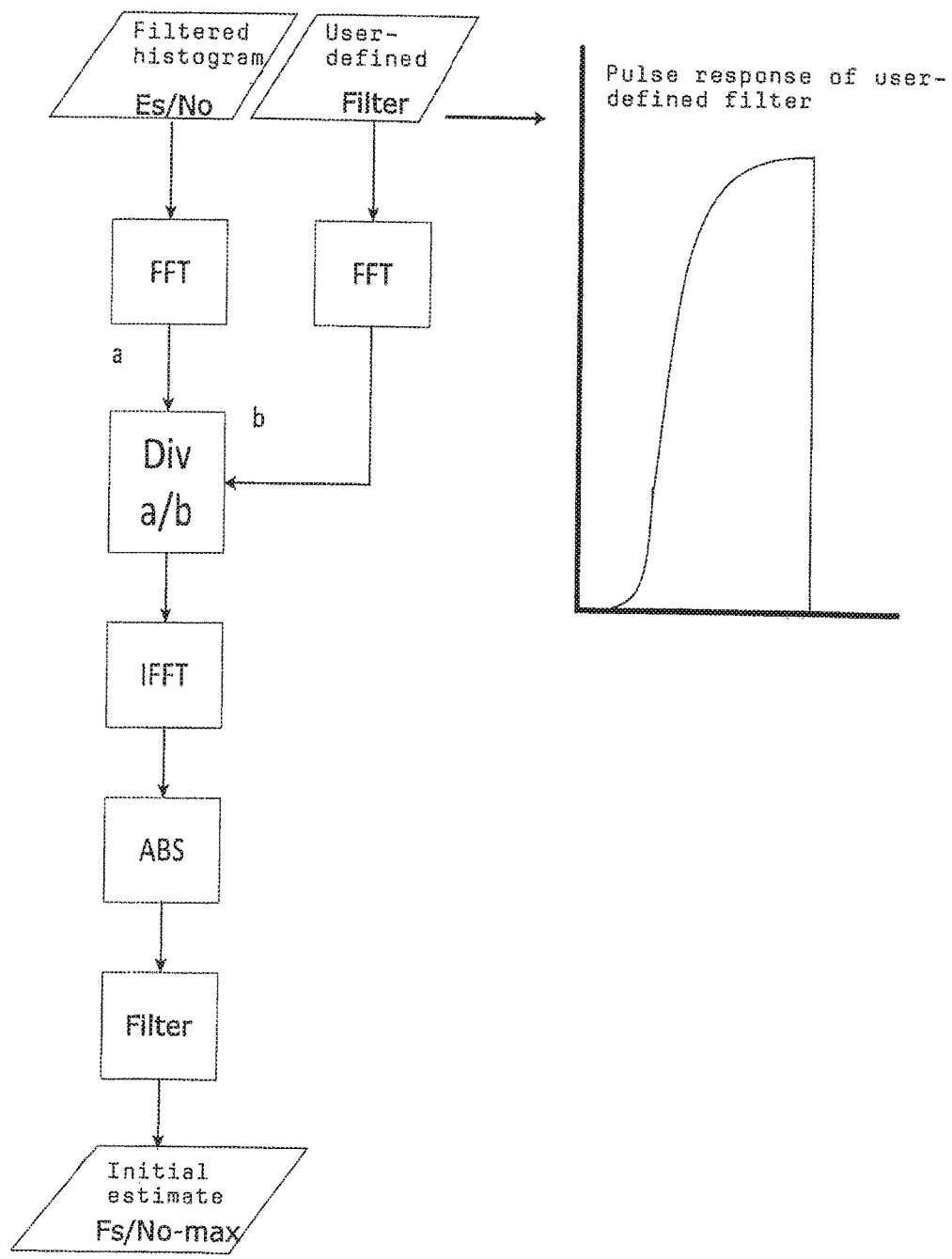
Figure 9:
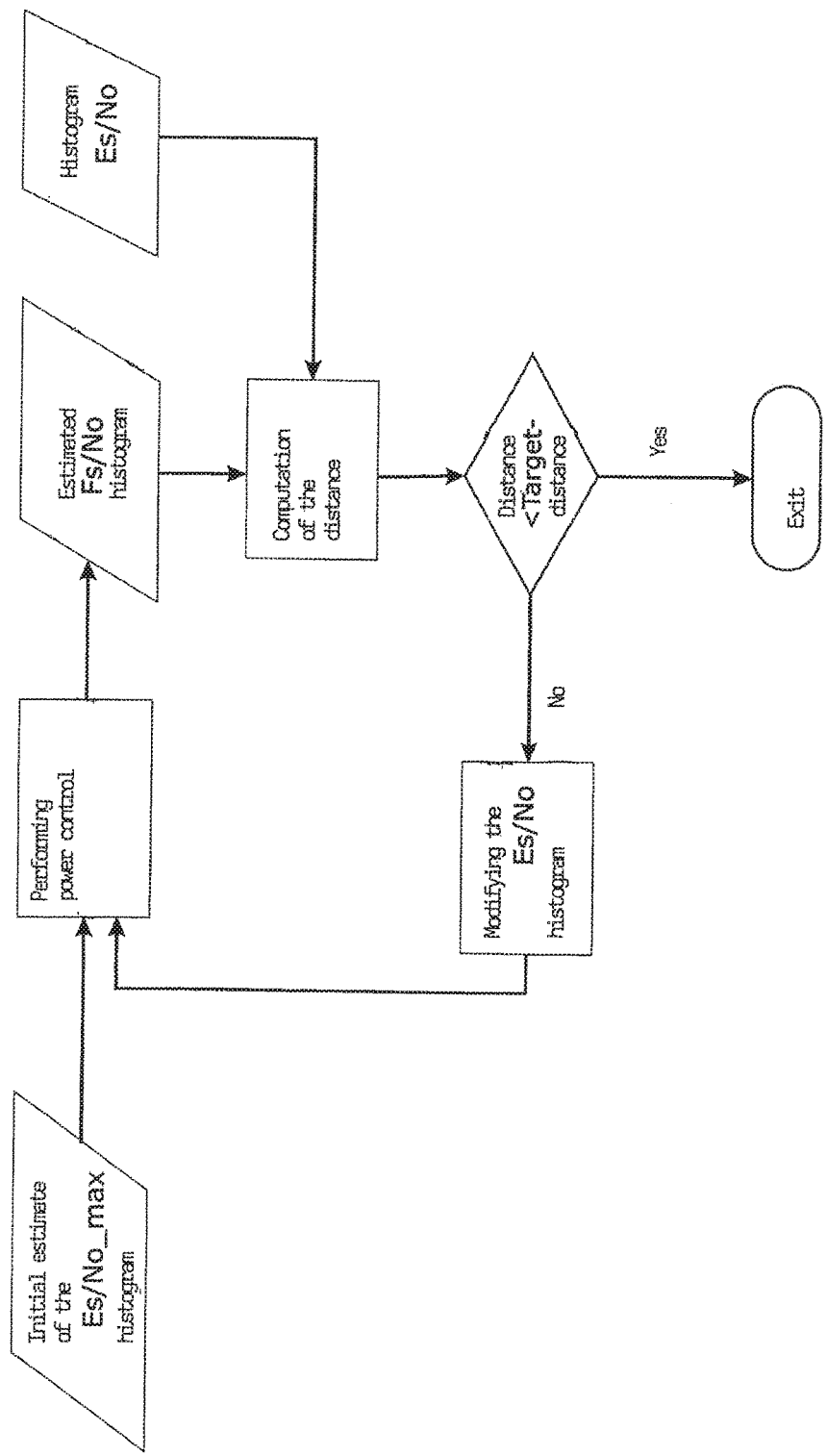
Figure 10:
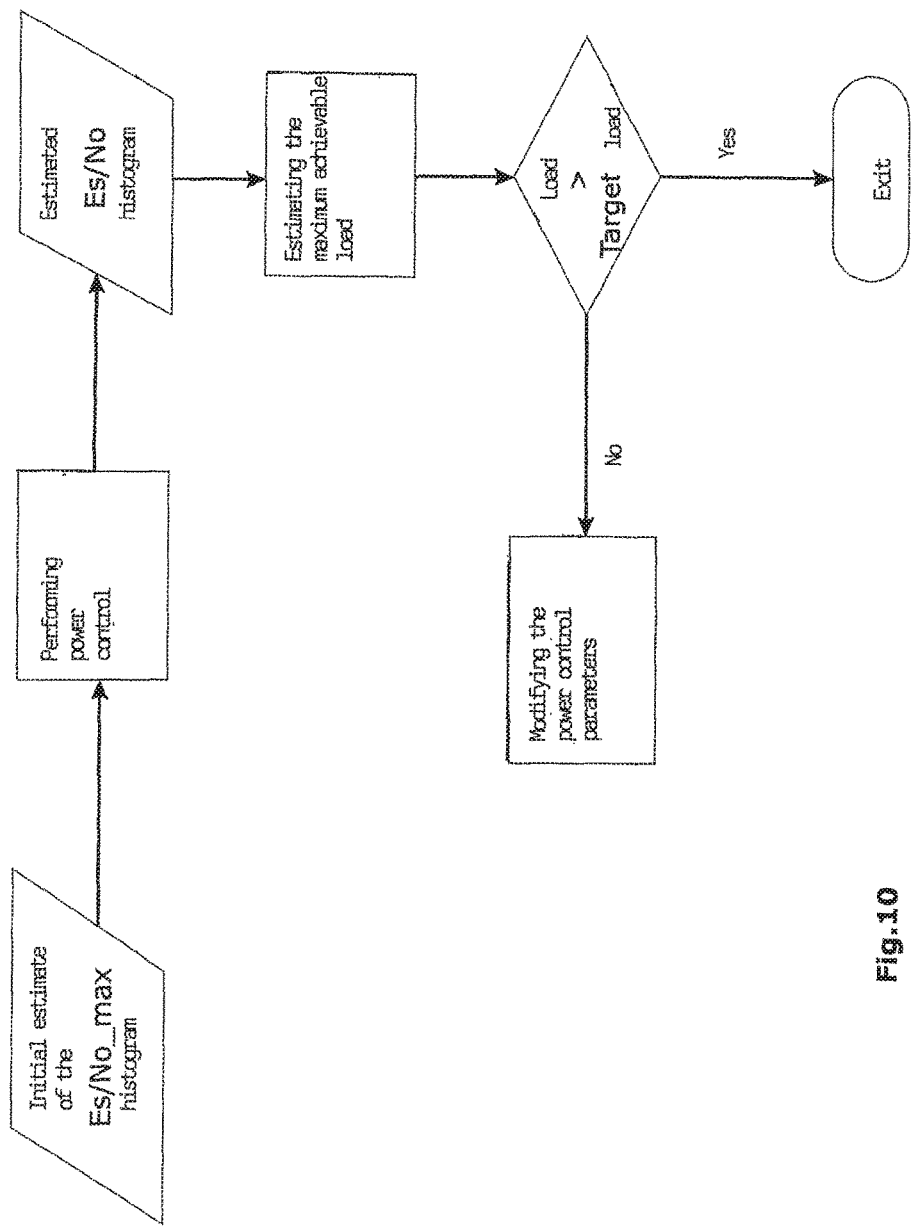
Figure 11:
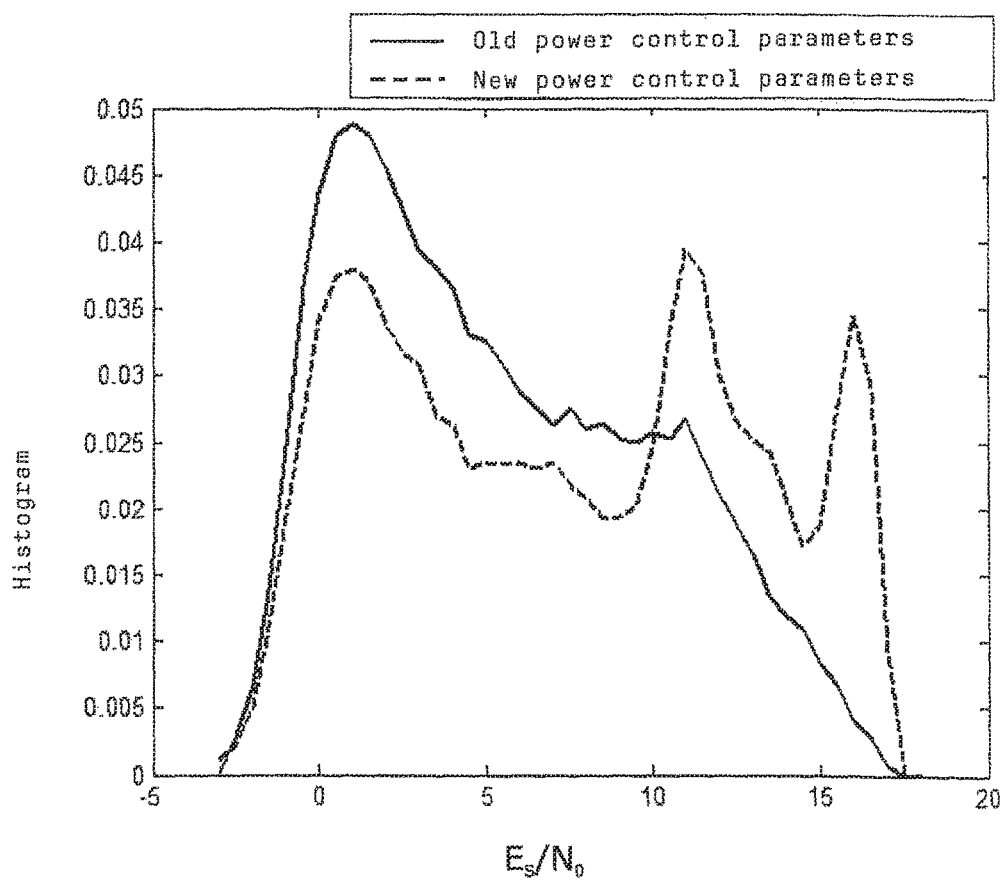
Figure 12:
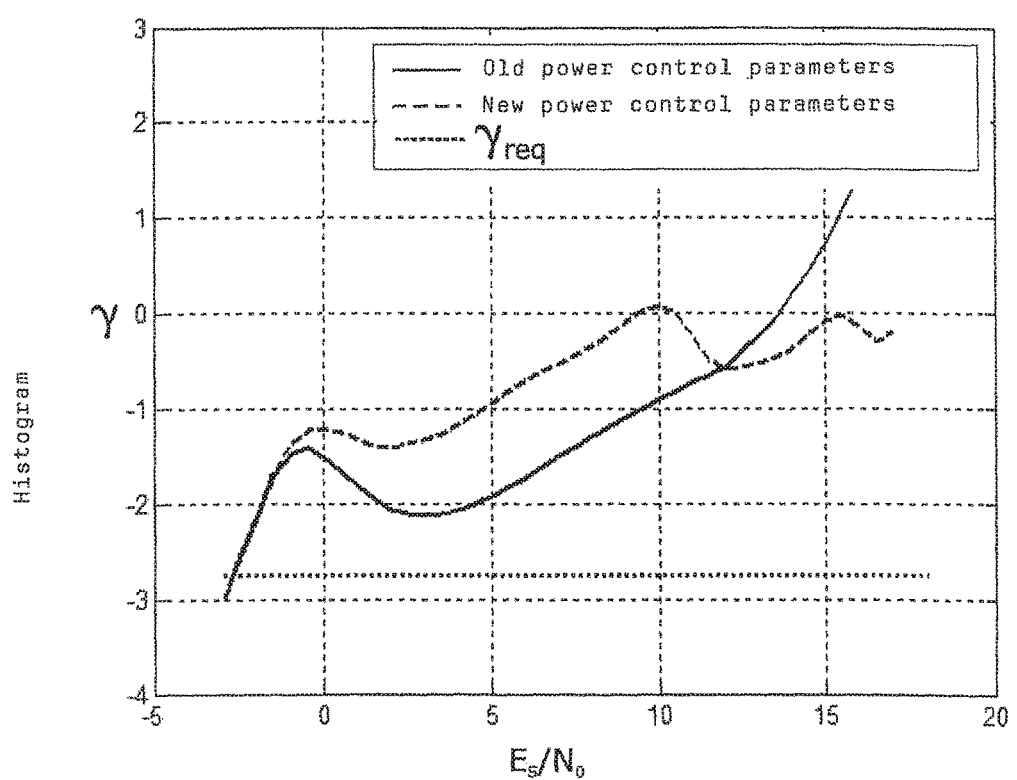

The invention will be described in greater detail hereunder with reference to the drawing. Therein, FIGS. 1 to 6 relate to the state of the art according to [3], wherein FIG. 1 $\gamma$ in relation to Es/No and the histogram Es/No for a system in which all transmitters are decoded, FIG. 2 $\gamma$ in relation to Es/No and the histogram Es/No for a system in which some packets are lost, FIG. 3 the histogram of Es/No for a setting in which some transmitters undergo attenuation by rain, FIG. 4 the histogram of Es/No for a multi-mode setting, FIG. 5 $\gamma$ in relation to Es/No for example 1, wherein the dashed line represents $\gamma$ when the method according to [2] is applied, and the solid line represents $\gamma$ when the method according to [3] is applied, and FIG. 6 $\gamma$ in relation to Es/No for a system with two modi, wherein the upper part of this Figure corresponds to mode 1 and the lower part corresponds to mode 2,
while the further Figures show the following:

FIG. 7 a block diagram for general description of the invention,

FIG. 8 a first method 1 according to the invention,

FIG. 9 a second method 2 according to the invention,

FIG. 10 a third method 3 according to the invention which is implemented for maximization of the maximally obtainable load as a gradient method with steep rise, FIG. 11 the normalized histogram of the relationship Es/No with old and new power control parameters, and FIG. 12 $\gamma$ in relation to Es/No with old and new power control parameters for a load of 150 packets per time slot.

In this invention, an method is proposed which allows to compute "good" values for the power control parameters defined in [3]. This method can be applied in the return link of a communications system in which several terminals communicate with a communication node, which we will denote as hub, using a random access scheme. No assumptions are made about the random access scheme, it might be slotted or unslotted, use spreading or not and it might use replicas or not. The hub might or might not use interference cancellation or any other kind of multi-user detection.

Terminals may use different physical and link layer configurations (transmission modes) to transmit their data.

Let it be assumed that a forward link exists over which the hub can send broadcast signaling to the terminals. The signaling sent to the terminals is defined in [3] and is shown in the afore-mentioned Table 1 and Table 2.

As described above in conjunction with [3], each terminal must first determine in which segment it is located. The terminal estimates its maximum achievable $E_s/N_C$, A, and assigns itself to segment "I" if and only if $E_s/N_C 0, i < A < E_s/N_C 0, i+1$. We will say in this case that the terminal belongs to segment "I". Afterwards, there is generated a pseudo random t number uniformly distributed between 0 and 1. If $t > p_{0,i}$ the transmitter randomizes its transmission power so that its $E_s/N_C$ at the receiver is uniformly distributed (in dB) between $E_s/N_C 0,1$ and A. Otherwise the transmitter randomizes its transmission power so that its $E_s/N_C$ at the receiver is uniformly distributed (in dB) between $E_s/N_C 0,i$ and A.

All the histograms used in this invention are in dB. This means that the x-axis of the histogram is given in dB.

The method described in this invention is based on the assumption explained hereunder that the hub knows the parameters in Table 1 and 2.

The block diagram of the method is shown in FIG. 7. The method needs 3 inputs:

The power control parameters in Tables 1 and 2;

A histogram of the estimated $E_s/N_C$ of the received bursts;

A model which, given the $E_s/N_{0_{max}}$ histogram, provides an estimate of the $E_s/N_C$ histogram at the receiver. $E_s/N_{0_{max}}$ refers to the $E_s/N_C$ at the receiver when terminals use their maximum transmission power.

Optionally one can feed as input also a previously available estimation of the $E_s/N_{0_{max}}$ histogram. This is for example the case if the invention is used to track the $E_s/N_{0_{max}}$ histogram over time, wherein one can use the estimate at time "t" as a starting point to determine the $E_s/N_{0_{max}}$ histogram at time "t+$\tau$".

Using these inputs the method according to the invention provides as output:

a set of "optimized power control parameters". The hub can then signal these parameters to the terminals which will use the parameters for the power control method defined in [3]. The objective of the method defined in this invention is that, using the new parameters, the $E_s/N_C$ distribution induced at the receiver will be "good" (high throughput and low burst loss rate), an estimate of the maximum load which can be supported with the new set of "optimized power control parameters". With this estimate the hub can determine whether the system is close to congestion or not.

The method of the invention works as follows.
1. The burst decoder provides a histogram of the $E_S/N_C$ of the received bursts.
3. The histogram of $E_S/N_C$ is filtered. A low pass filter (in the average range) is preferred.
3. If a previous $E_S/N_{0_{max}}$ histogram estimate exists, it is selected. Otherwise Method 1 as explained hereinbelow is applied to the filtered $E_S/N_C$ histogram in order to obtain an initial estimate of the $E_S/N_{0_{max}}$ histogram.
4. Method 2 is applied to the initial estimate of $E_S/N_{0_{max}}=$. This provides a refined estimate of the $E_S/N_{0_{max}}$ histogram.
5. Method 3 is applied to the final estimate of $E_S/N_{0_{max}}$. This method provides at its output a set of power control parameters and an estimate of the maximum load which can be achieved using these power control parameters.

In the following we provide a detailed description of methods 1, 2 and 3.

Method 1

The block diagram of this method is shown in FIG. 8. This method provides an estimate of the histogram of $E_S/N_{0_{max}}$ out of the filtered $E_S/N_C$ histogram.

A "custom filter" is preferred to be used whose pulse response has the form of the left side of a bell-shaped curve as shown in FIG. 8.
1. Compute FFT of the filtered $E_S/N_C$ histogram
2. Compute FFT of custom filter
3. Compute X=FFT (filtered $E_S/N_C$ histogram)/FFT (custom filter).
4. Compute Y=IFFT (X)
5. Compute Z=abs(Y)
6. The $E_S/N_{0_{max}}$ histogram is a filtered version of Z. The filter is preferred to be a low pass filter.

Method 2

This method uses a function "apply power control" which, out of the $E_S/N_{0_{max}}$ histogram, provides an estimation of the $E_S/N_C$ histogram after power control. An example of this function is provided below.

Method 2 is a numerical optimization method which tries to find the $E_S/N_{0_{max}}$ which induces a $E_S/N_C$ histogram which is closest to the $E_S/N_C$ histogram obtained from the burst demodulator (see FIG. 7). The metric to be minimized can be the Euclidean distance between the histograms (the estimated one). Many optimization methods can be used at this point, for example: gradient descent methods, "simulated annealing" methods and genetic methods.

Here we present an example of how the method could be implemented as a gradient method with steep descent:
1. Apply power control to the $E_S/N_{0_{max}}$ histogram. This provides an estimate of the $E_S/N_C$ histogram.
2. Compute the distance between the estimated $E_S/N_C$ histogram obtained in step 1 and the $E_S/N_C$ histogram obtained from the burst decoder (see FIG. 7). The distance can be the Euclidean distance between the histograms.
3. If the distance is below a specified target, the method ends, providing at its output the estimate of the $E_S/N_{0_{max}}$ histogram. Otherwise the $E_S/N_{0_{max}}$ histogram is modified and the method goes to step 1.
4. The method is repeated until the distance is below the specified target or until a maximum number of iterations have been performed.

Apply Power Control Function

Assuming the power control parameters in table 1 defines m segments for mode 0 and that the histogram is defined on n points X_1, X_2, . . . , X_n. Reference will be made to the values of the $E_S/N_{0_{max}}$ histogram as Y_1, Y_2, . . . , Y_n. and to the values of the estimated $E_S/N_C$ histogram as:

Define an array with n elements, Z_1, Z_2, . . . , Z_n, and set all elements to 0

For every histogram bar X_j
  Determine to which segment the point belongs. Point X_j will belong to segment "I" if and only if $E_S/N_C$0, i<X_j<$E_S/N_C$0,i+1.
  Assuming X_j belongs to segment i, the following will be done:
    We find the point X_u which is closest to $E_S/N_C$0,1 and set A0=u.
    We find the point X_u which is closest to $E_S/N_C$0,i and set A1=u.
    We find the point X_u which is closest to $E_S/N_C$0,i+1 and set A2=u.
  For k=A0 to k=A1, with k increasing $Z\_k=Z\_k+(1-p\_i)*Xj/(A1-A0+1)$ For k=A1 to k=A2, with k increasing $Z\_k=Z\_k+(p\_i)*Xj/(A2-A1+1)$ After finishing the loop over all histogram bars, the estimated $E_S/N_C$ histogram is obtained by filtering Z with a filter whose impulse response corresponds to the left half of a bell shaped curve as shown in FIG. 6.

Method 3

Method 3 is a numerical optimization method which receives as input the estimate $E_S/N_{0_{max}}$ histogram. The method tries to find the set of power control parameters which maximizes one of these two metrics:
  The estimated maximum load (in packets/slot or packets/second)
  The distance to a desired $E_S/N_C$ histogram.

At every iteration the method does the following:
  Generate a new set of power control parameters
  Run the function "apply power control" using the new set of power control parameters and the estimated $E_S/N_{0_{max}}$ histogram. This function provides an estimation of the $E_S/N_C$ histogram.
  Optimization metric. There are two options:
    Compute the distance from the estimated $E_S/N_C$ histogram. The distance must be minimized
    Estimate the maximum achievable load using out of the $E_S/N_C$ histogram. The load must be maximized.
  If the $E_S/N_C$ histogram achieves the target distance or target load, the method stops.
  Otherwise a new set of power control parameters is generated.

Different numerical methods could be applied, for example: gradient descent/ascent, simulated "annealing" and genetic methods.

In FIG. 10, there is given an example of a gradient ascent method used to maximize the maximum achievable load. If the target load is not achieved after a maximum number of iterations the method stops.

The invention can be defined by the following characteristics:
  The invention proposes an method which receives as input the $E_S/N_C$ histogram of received bursts (packets) and provides at its output a set of optimized power control parameters.
  The method can be divided in two steps:
    Step 1. This step covers methods 1 and 2. Out of the $E_S/N_C$ histogram and knowing the set of power control parameters used by the terminals, the $E_S/N_{0_{max}}$ histogram is estimated Step 2. This step covers method 3. Using the estimated $E_S/N_{0_{max}}$ histogram, a set of optimized power control parameters is computed.

The set of optimized power control parameters is obtained by:
  Estimating the $E_S/N_C$ histogram using the power control parameters and minimizing the distance to a desired $E_S/N_C$ histogram (for example, a uniformly distributed histogram in dB).
  Estimating the maximum achievable load out of the estimated $E_S/N_C$ histogram induced by the power control parameters.

EXAMPLE 1

Let there be considered the return link of a satellite communication system and let the focus be on one of the beams of the return link. Terminals transmit using slotted spread spectrum aloha (SSA) and the receiver uses SIC. All terminals use the same transmission mode like e.g.:
  BPSK modulation
  Code rate=1/3
  Spreading factor 32.
  Load 150 packets/slot The link margin for a transmitter positioned in the center of the beam is 20 dB and the required $E_s/N_C$ for decoding is γreq=−2.7 dB.

The link budget loss due the position of a transmitter in the beam is $L_b$ and follows a uniform distribution (−6.0 dB).

The terminals' estimate of $L_b$, $\hat{L}_b$, is Gaussian distributed in dB with mean $L_b$ and standard deviation 0.5 dB.

A fraction 25% of the terminals has rain attenuation. The rain attenuation $L_r$ has a Gaussian distribution in dB with mean −10 dB and standard deviation 1 dB. The terminals' estimate of the rain attenuation $\hat{L}_r$ is Gaussian distributed in dB, and has mean $L_r$ and standard deviation 1 dB.

| Mode | Es/No_1 | Es/No_2 |
|---|---|---|
| 1 | 0 | 22 |

| Mode | p_1 |
|---|---|
| 1 | 0.0 |

In this example, the power control parameters are optimized to maximize the maximum achievable load.

The set of optimized power control parameters are:

| Mode | Es/No_1 | Es/No_2 | Es/No_3 | Es/No_4 | Es/No_5 | Es/No_6 | Es/No_7 |
|---|---|---|---|---|---|---|---|
| 1 | −1 | 4 | 8 | 11 | 14 | 17 | 22 |

| Mode | p_1 | p_2 | p_3 | p_4 | p_5 | p_6 |
|---|---|---|---|---|---|---|
| 1 | 0.0 | 0.0372 | 0.9877 | 0.4170 | 0.1715 | 0.6617 |

The set of optimized power control parameters will be referred to as "new" power control parameters.

In FIG. 11, there can be observed that the $E_s/N_C$ histogram with the new power control parameters is closer to a uniform distribution than the histogram with the old parameters. In FIG. 12, there is shown the plot of γ vs $E_s/N_C$ for the old and new power control parameters. It can be observed how, with the new power control parameters, the curve γ vs $E_s/N_C$ is "flatter" and farther from γreq.

With the "old" power control parameters the maximum load was 185 packets/slot whereas with the new power control parameters the maximum load is 245 packets/slot. Hence, in this specific case, the power control method allows to increase the load by 32%.

The invention can be employed in Wireless communication systems, like e.g. satellite communication systems and mobile communication systems.

LIST OF ABBREVIATIONS

IFFT Inverse Fast Fourier Transformation
FFT Fast Fourier Transformation
SIC Successive Interference Cancellation
SSA Spread Spectrum Aloha

REFERENCES

[1] R. De Gaudenzi, O. Del Rio Herrero, "Advances in Random Access protocols for satellite networks", 2009 International Workshop on Satellite and Space Communications, IWSSC 2009, Siena, Itallen
[2] ETSI TS 102 721-3 V1.1.1 "Satellite Earth Stations and Systems; Air Interface for S-band Mobile Interactive Multimedia (S-MIM); Part 3: Physical Layer Specification, Return Link Asynchronous Access."
[3] EP 2 861 024 A1 (corresponds to DE 10 2013 221 866 A1)

The invention claimed is:

1. Method for determining the power control parameters for controlling the power by which, in a communication system, signals can be transmitted from transmitters of a group of a plurality of transmitters to a receiver assigned to this group, the transmission being performed in a packet-wise manner according to a multiplex specification, wherein, in said method,
  a. the transmitters are divided into one or more groups,
  b. the transmission power used by the transmitters in one group is determined in a way so that the signal-to-interference ratio lies between a minimum and a maximum value,
  c. every transmitter in a group determines its transmission power randomly so that its signal-to-noise ratio at the receiver lies between a minimum and maximum value,
  d. the method to compute randomly the transmission power depends on a probability value in a way so that, depending on this probability value, the signal-to-noise ratio achieved at the receiver lies within the total range of allowed signal-to-noise ratios or within the signal-to-noise ratio range allowed for the group to which the transmitter belongs,
  e. wherein a first table defines the minimum and maximum signal-to-noise ratio values that determine to which group a transmitter belongs, f. wherein a second table defines the probability value used for the transmitter to determine its transmission power in a way so that its signal-to-noise ratio lies within the total allowed signal-to-noise ratio range or within the allowed the signal-to-noise ratio for the group to which the transmitter belongs, wherein
g. new values for the first and second tables are defined so as to
h. maximize the maximum load in packets per second that the communication channel can accept while maintaining a desired threshold packet error rate and/or
i. the distance from a histogram of received signal-to-noise ratios in dB to a uniform histogram of the signal-to-noise ratios in Db is minimized, and
k. the defining of new values for the first and second tables is performed in two steps, wherein
l. in a first step, based in the histogram of the signal-to-noise ratio in dB at the receiver and the previous values of the tables, the histogram of the maximum signal-to-noise ratio in dB that the transmitters would reach if they would transmit with their maximum available transmission power, is estimated, and
m. in a second step, taking as input the estimation of the histogram of the maximum signal-to-noise ratio in dB that the transmitters would reach if they would transmit with their maximum available transmission power, new values for the first and second tables are computed.

2. Method according to claim 1, wherein the first step comprises the following sub-steps:
1a. applying a low pass filter to the histogram of the signal-to-noise ratio in dB,
1b. performing an initial estimate of the histogram of the maximum signal-to-noise ratio in dB that the transmitters would reach if they would transmit with their maximum available transmission power,
1c. using a model to estimate the histogram of signal-to-noise ratio at the receiver out of the histogram of the maximum signal-to-noise ratio in dB that the transmitters would reach if they would transmit with their maximum available transmission power,
1d. iterative refining of the estimation of the histogram of the maximum signal-to-noise ratio in decibel that the transmitters would reach if they would transmit with their maximum available transmission power wherein, by using a numerical optimization method that, by using the model according to sub-step 1c), tries to find the histogram of the signal-to-noise ratio at the receiver out of the histogram of the maximum signal-to-noise ratio in decibel that the transmitters would reach if they would transmit with their maximum available transmission power, the distance to low-pass-filtered histogram of the signal-to-noise ratio in decibel at the receiver is minimized.

3. Method according to claim 2, wherein the second step comprises the following sub-steps:
2a. taking as input the output of the first sub-step that is an estimation of the histogram of the maximum signal-to-noise ratio in decibel that the transmitters would reach if they would transmit with their maximum available transmission power,
2b. using a model to estimate the histogram of signal-to-noise ratio at the receiver out of the histogram of the maximum signal-to-noise ratio in decibel that the transmitters would reach if they would transmit with their maximum available transmission power is used, 2c. computing the new values for the first and second tables that optimize the metric defined in steps h) and/or i).

4. Method according to claim 2, wherein the impulse response of the low pass filter corresponds to the left half of a bell-shaped curve.

5. Method according to claim 2, wherein the initial estimate of the histogram of the maximum signal-to-noise ratio in dB that the transmitters would reach if they would transmit with their maximum available transmission power is used corresponds to an output of the first step in the past that has been stored.

6. Method according to claim 1, wherein in sub-step 1d) a numerical method is used which is either
   a. a gradient method
   b. simulated "annealing"
   c. an evolutionary algorithm
   d. a convex optimization method.

7. Method according to claim 1, wherein in sub-step 2c) a numerical method is used which is either
   a. a gradient method
   b. simulated "annealing"
   c. an evolutionary algorithm
   d. a convex optimization method.

8. Method according to any claim 1, wherein the model for estimating the histogram of signal-to-noise ratio at the receiver out of the histogram of the maximum signal-to-noise ratio in decibel that the transmitters would reach if they would transmit with their maximum available transmission power is used, is performed by the following substeps:
   a. assuming the power control parameters in the first table define m signal-to-noise ratio segments and that the histogram is defined on n points $X\_1$, $XJ2$, $X\_n$, the value of the histogram as those n points are denoted as $Y\_1, Y\_2, \ldots, Y\_n$.
   b. denoting the "m−1" values in the second table by $p\_1, p\_2, \ldots p\_m-1$,
   c. defining an array with n elements, $Z\_1, Z\_2, Z\_n$, and setting ail elements to 0,
   d. for every histogram value XJ, j from 1 to n:
      i. determine to which segment the point belongs, wherein point XJ will belong to segment T if and only if XJ is between the i−1th and the ith entry in the first table,
      ii. once the segment has been determined and assuming XJ belongs to segment i:
         1. find the point $X\_u$ that is closer to the first entry in the first table and define A0=u,
         2. find the point Xjj that is closer to the "!−1"th entry in the first table and define A1=u,
         3. find the point $X\_u$ that is closer to the Tth entry in the first table and define A1=u,
      iii. for $k^{TM}A0$ to k=A1, with k increasing
         1. $Z\_k=Z\_k+(1-pJ)*Xj/(A1-A0+1)$
      iv. for k=A1 to k=A2, with k increasing
         1. $Z\_k=Z\cdot k+(pj)*Xj/(A2-A1+1)$
   e. after finishing the loop over the histogram values XJ, obtaining the estimated histogram of the signal-to-noise ratio at the receiver by filtering the array Z with a low pass filter.

9. Method according to claim 1, wherein
the transmission powers by which the transmitters of a group transmit are within a total power range, and
to each transmitter, a parameter is assigned which indicates how high the transmission power is by which the respective transmitter transmits, wherein the parameter is computed on the basis of a random number and on the basis of probability values as to how many transmitters of the group respectively transmit with a transmission power within different presettable transmission power segments which themselves are within the total transmission power range.

10. Method according to claim 1, wherein
a first table is provided which indicates different transmission power segments of the total transmission power range that are respectively defined by a lower limiting value and an upper limiting value,
a second table is provided in which, for each transmission power segment, a statistical probability value is included which indicates how many transmitters transmit with a transmission power within the respective transmission power segment,
wherein each probability value of the second table is assigned to a different transmission power segment, whereby, by said two tables, the expectation is defined as to how many transmitters of the group transmit signals with a transmission power within the respective transmission power segment,
for each transmitter, a random number is provided, either by the transmitter itself or from outside, on whose basis probability values to be assigned to the respective transmitters are computed as the assigned parameters of the transmitters and, thereby, to each transmitter, there is assigned that transmission power segment which includes the transmission power by which the respective transmitter transmits, and
the amount of the transmission power by which the respective transmitter transmits is selected within the transmission power segment assigned to this transmitter, by performing a further computation performed on the basis of a random number.

11. Method according to claim 1, wherein
each transmitter has a maximum transmission power, wherein each transmitter is assigned to that transmission power segment which includes its maximum transmission power, wherein, for each transmitter, a random number, computed under consideration of a uniform distribution over a presettable range of numbers, is provided, notably by the transmitter itself or from outside of the transmitter, on whose basis, with the aid of the probability value for the transmission power segment assigned to the respective transmitter, it is detected whether the transmission power of the transmitter lies between the lower limit of the respective transmission power segment and a maximum transmission power, or between the lower limit of the total transmission power and its maximum transmission power.

12. Method according to claim 1, wherein
each transmitter has a maximum transmission power, wherein each transmitter is assigned to that transmission power segment which includes its maximum transmission power, wherein, for each transmitter, a random number, computed under consideration of a uniform distribution over a presettable numerical range, is provided which, with uniform statistical distribution, can lie within the numerical range and particularly between zero and one, and wherein the respective transmitter
if its random number is smaller than the probability value for the transmission power segment to which the transmitter is assigned, transmits with a transmission power between the lower limit of the transmission power segment and the maximum transmission power of the transmitter, and
if its random number is larger than or equal to the probability value for the transmission power segment to which the transmitter is assigned, transmits with a transmission power between the lower limit of the total transmission power range and the maximum transmission power of the transmitter.

13. Method according to claim 1, wherein
the transmitters can transmit in different modes, wherein, for each mode, control of the transmission powers of all transmitters is performed.

14. Method according to claim 1, wherein
the transmitters can transmit in different transmission rates, wherein, for each mode, a different control of the transmission powers of all transmitters is performed.

15. Method according to claim 1, wherein,
prior to transmission of a signal from the transmitter to the receiver and/or in regular or irregular intervals, control of the transmission powers of the transmitters is performed.

16. Method according to claim 1, wherein
the multiplex specification according to which, in the communication system, signals are transmitted from transmitters of a group of multiple transmitters to a receiver assigned to this group, is a random specification.

* * * * *